United States Patent [19]
Adachi

[11] 3,927,915
[45] Dec. 23, 1975

[54] VEHICLE ANTI-LOCK BRAKE SYSTEM WITH BOOSTER DEVICE

[75] Inventor: Yoshiharu Adachi, Aichi, Japan

[73] Assignee: Aisin Seiki Kabushiki Kaisha, Kariya, Japan

[22] Filed: Aug. 8, 1974

[21] Appl. No.: 495,809

[30] Foreign Application Priority Data
Aug. 18, 1973  Japan .................. 48-92711

[52] U.S. Cl. .............. 303/21 F; 303/21 AF; 303/52
[51] Int. Cl.² ............................................ B60T 8/06
[58] Field of Search .......... 303/21 F, 52, 21 AF, 10, 303/61–63, 68–69; 188/181 A; 60/561, 580, 581

[56] References Cited
UNITED STATES PATENTS

| | | | |
|---|---|---|---|
| 3,586,388 | 6/1971 | Stelzer | 303/21 F |
| 3,687,504 | 8/1972 | Riordan | 303/21 F |
| 3,729,235 | 4/1973 | Bach et al. | 303/21 F |
| 3,738,712 | 6/1973 | Flory | 303/21 F |

*Primary Examiner*—Trygve M. Blix
*Assistant Examiner*—Douglas C. Butler
*Attorney, Agent, or Firm*—Finnegan, Henderson, Farabow & Garrett

[57] ABSTRACT

A vehicle brake system including at least one master cylinder, a power piston operatively connected with the master cylinder, a pressure chamber defined at a side of the power piston opposite to the master cylinder, a reaction chamber defined at the other side of the power piston, a first fluid circuit for introducing a controlled pressure into the pressure chamber for applying a force to the brake, and a second fluid circuit for introducing a controlled fluid pressure into the reaction chamber to release the force on the brake when wheel lock is detected, the second fluid pressure circuit being independent from the first fluid pressure circuit.

15 Claims, 3 Drawing Figures

3,927,915

VEHICLE ANTI-LOCK BRAKE SYSTEM WITH BOOSTER DEVICE

BACKGROUND OF THE INVENTION

The present invention relates generally to a vehicle brake system and more particularly to a vehicle brake system having a wheel anti-lock means.

Hithertofore, there has been developed wheel anti-lock means for preventing undesirable skidding of the wheels during an application of force to the brakes. Conventionally, such vehicle anti-lock brake systems include master cylinder means hydraulically connected with wheel brakes, and brake power multiplying means that includes a power piston operatively connected with said master cylinder means for operating the same and having a hydraulic system separate from that of the master cylinder means. The power piston of the brake power multiplying means defines a pressure chamber and a reaction chamber at the opposite sides thereof. The pressure chamber is normally maintained at a low pressure. During a braking condition high pressure is applied to the pressure chamber so as to displace the power piston toward the master cylinder whereby the master cylinder is actuated to produce hydraulic pressure to the brake. When wheel lock is sensed by an appropriate sensor, the pressure chamber is connected with the reaction chamber to introduce high pressure fluid from the pressure chamber into the reaction chamber so that the power piston is displaced away from the master cylinder and thus release the force on the brake. In this previously known arrangement, although the rate of pressure increase in the reaction chamber is sufficiently high immediately after the reaction chamber is connected with the pressure chamber, the rate of pressure increase gradually decreases as the pressure in the reaction chamber reaches the pressure in the pressure chamber. This results in a decrease in the rate of brake pressure change. Thus, the conventional vehicle anti-lock brake system cannot provide satisfactory response to the locking of the vehicle wheel.

In order to eliminate the aforementioned disadvantage, there has been proposed to provide a pluality of connecting passages with orifices of different dimensions between the pressure and reaction chambers, and to selectively put the connecting passages in operation in accordance with the locking condition of the associated wheel. This arrangement is, disadvantageous in that the structure becomes complicated and requires increased space. Furthermore, in the conventional arrangements the pressure in the reaction chamber cannot exceed the pressure in the pressure chamber, so that it may sometimes become necesary to make the cross-sectional area of the reaction chamber greater than that of the pressure chamber. It has also been required in the conventional arrangement to provide a strong return spring on the power piston so as to overcome high pressure in the pressure chamber.

It is therefore an object of the present invention to provide a new and improved vehicle brake system having wheel anti-lock means which can positively prevent wheel locking during braking operation.

Another object of the present invention is to provide a vehicle anti-lock brake system that includes brake power multiplying means having a power piston defining a pressure chamber and a reaction chamber at the opposite sides thereof, the pressure and reaction chambers being separately with a fluid pressure source so as to make the brake release pressure introduced into the reaction chamber independent from the brake applying pressure introduced into the pressure chamber.

A further object of the present invention is to provide anti-lock brake means wherein brake applying pressure is provided independently by manually operated brake valve means and brake release pressure is provided in response to detection of wheel lock independently by anti-lock valve means.

A still further object of the present invention is to provide a vehicle brake system having anti-lock means which is simple in construction, reliable in operation and requires less space.

The above and other objects of the present invention can be achieved in accordance with the present invention by a vehicle anti-lock brake system comprising brake master cylinder means for actuating wheel brake means, brake power multiplying means including pressure responsive means operatively connected with said brake master cylinder means and pressure chamber means defined at one side of said pressure responsive means, means including a first fluid circuit for introducing a brake applying pressure into said pressure chamber so as to actuate said pressure responsive means in brake applying direction, anti-lock means including reaction chamber means defined at the other side of said pressure responsive means and means including a second fluid circuit independent from said first circuit for introducing brake release pressure into said reaction chamber when wheel lock is detected. Preferably, the pressure responsive means is constituted by power piston means connected with said master cylinder means.

The above and other objects and features of the present invention will become apparent from the following descriptions of preferred embodiments taking reference to the accompanying drawings, in which.

Reference will now be made in detail to the present preferred embodiments of the invention, examples of which are illustrated in the accompanying drawings.

Figure 1:
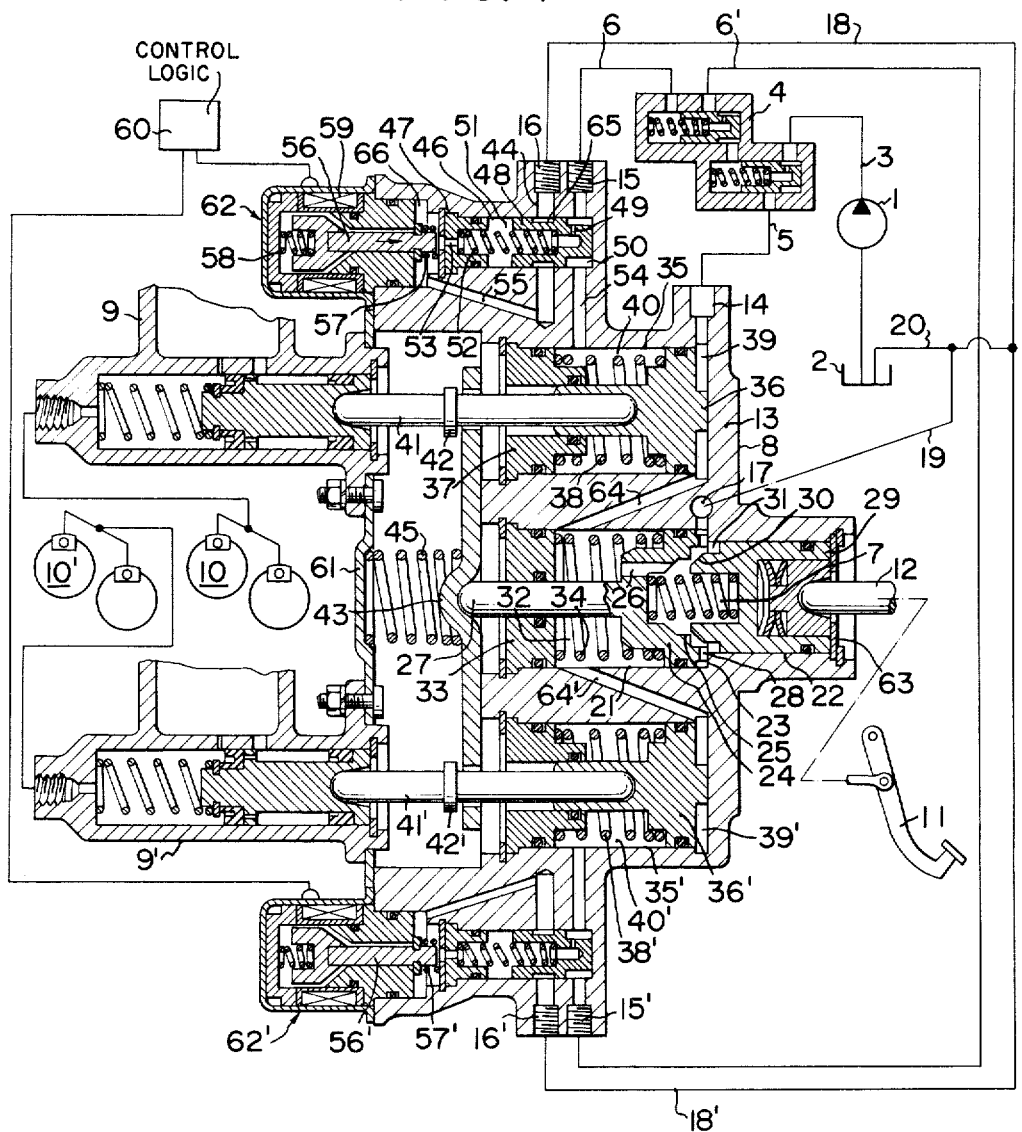
FIG. 1 is a diagrammatical view of a brake system showing wheel anti-lock means of the present invention in a sectional view.

Referring to the drawings, particularly to FIG. 1, there is shown a vehicle brake system comprising front and rear wheel brakes 10 and 10' which are respectively actuated by fluid pressure supplied from brake master cylinders 9 and 9' of conventional construction. The master cylinders 9 and 9' are combined in the vehicle anti-lock brake system 8 with wheel anti-lock valve means and brake power multiplying means for each of the master cylinders 9 and 9'. The brake system includes a fluid supply source 1 which may be a hydraulic pump driven by a vehicle engine (not shown). The fluid supply source 1 draws hydraulic fluid from a reservoir 2 and supplies the fluid under pressure through a pipe 3 to a flow divider valve 4. The valve 4 may be of a known construction and divides the final flow from the pipe 3 into three pipes 5, 6 and 6' at a predetermined ratio irrespective of the pressure therein.

The brake power multiplying means for the master cylinder 9 includes a power piston 36 which is disposed in a bore 35 formed in a housing 13 of the vehicle wheel antilock brake system 8 and has a piston rod 41 engaging with a piston in the master cylinder 9. As shown in FIG. 1, the power piston 36 is slidably received in a plug plate 37 to be guided thereby. A pressure chamber 39 is defined at the side of the power piston 36 opposite to the master cylinder 9, and a reaction chamber 40 at the other side of the power piston 36. The pipe 5 is connected through a port 14 with the pressure chamber 39. The brake power multiplying means for the master cylinder 9' has the same structure as the aforementioned brake power multiplying means, so that corresponding parts are shown by the same reference numerals with the addition of prime.

The housing 13 has an axial bore 21 formed therein and a piston 24 is slidably disposed in the bore 21. The piston 24 has a piston rod 27 which is guided by a plug plate 33 and has an outer end engaging with a lever or actuator plate 43 at its intermediate portion. The actuator plate 43 has bores at the opposite end portions thereof for allowing the rods 41 and 41' to pass therethrough. The rods 41 and 41' have flanges 42 and 42', respectively, for engagement with the actuator plate 43 so that when the actuator plate 43 is moved toward the left in the drawing, the rods 41 and 41' are also moved toward the left to actuate the master cylinders 9 and 9'. The reference numeral 45 designates a return spring for the actuator plate 43.

The housing 13 also has an axial bore 22 which is coaxial and connected with the bore 21 to define a shoulder 23 therebetween. In the bore 22, there is disposed a brake control valve member 29 which is slidably received in the bore 22 and connected through a push rod 12 with a manually operated foot pedal 11. The piston 24 has a recess 25 at the side facing the valve member 29. The valve member 29 has a conical end surface 30 co-operating with the recess 25 to define a flow passage 28 therebetween. A chamber 32 is defined in the bore 21 between the piston 24 and the plug plate 33. A spring 34 is disposed in the chamber 32 for urging the piston 24 toward the shoulder 23 against the biasing force of a spring 7 disposed between the valve member 29 and the piston 24, spring 7 having a less force thereof than that of the spring 34. The chamber 32 is connected with the pressure chamber 39 and 39' of the brake power multiplying means through passages 64 and 64', and also connected through a passage 26 formed in the piston 24 with the passage 28. Passage 28 is connected through a port 17 and a pipe 19 with a return line 20. Thus, a fluid flow is established from the fluid source 1 through the pipe 3, the flow divider valve 4, the pipe 5, into the pressure chamber 39, through the passage 64, the chamber 32, the passages 26 and 28, the port 17, the lines 19 and 20, and into the reservoir 2. The pressure in the chamber 32 is transmitted through the passage 64' into the pressure chamber 39'.

The wheel anti-lock valve means for the master cylinder 9 includes a bore 46 formed in the housing 13. In the bore 46, there is slidably disposed a flow control valve member 48 having an orifice 49. The pipe 6 from the flow divider valve 4 is connected through a port 15 with a chamber 50 defined at one end of the bore 46 by said valve member 48. Another chamber 51 is defined in the bore 46 at the other side of the valve member 48 and connected through the orifice 49 with the chamber 50. A valve seat member 47 having a valve bore 53 is secured to the housing 13 at the other end of the bore 46. A spring 52 is disposed between the valve seat member 47 and the valve member 48 to urge the latter toward the right in the drawing.

A solenoid valve assembly 62 is mounted on the housing 13 at the left side of the valve seat member 47 and has an axially movable valve member 56 for cooperation with the valve bore 53 in the valve seat member 47. The valve member 56 is biased by a spring 58 toward the valve bore 53 but a spring 57 is provided for retracting the valve member 56 against the action of the spring 58 so as to normally keep the valve bore 53 open. A logic circuit 60 of known construction is connected to a solenoid 59 for energizing the same when skidding or locking is sensed in the associated wheel. A chamber 66 defined at the left side of the valve seat member 47 is connected through a passage 55 to an annular groove 65 formed around the flow control valve member 48. The annular groove 65 is connected to a passage 44, passage 44 to the port 16 which is in turn connected through a pipe 18 with the return line 20. The chamber 50 is connected through a passage 54 with the reaction chamber 40. The solenoid 59 is normally de-energized so that the valve member 56 is retracted toward the left by the spring 57. Thus, the pressure in the chamber 51 is relieved through the valve bore 53, the chamber 66, the passage 55 and the annular groove 65 to the port 16, so that the valve member 48 is displaced toward the left under the influence of pressure in the chamber 50 until the chamber 50 is opened to the port 16. When the solenoid 50 is energized, the valve member 56 is moved toward right as shown by an arrow in the drawing to close the valve bore 53. Thus, a pressure is established in the chamber 51 and the valve member 48 if moved toward right under the influence of the spring 52 to interrupt the connection between the chamber 50 and the port 16.

The wheel anti-lock valve means for the master cylinder 9' is the same as the aforementioned one and corresponding parts are designated by the same reference numerals with the addition of prime.

In operation, pressurized fluid is continuously supplied from the fluid source 1 through the pipe 3 to the flow divider valve 4. The fluid flow is then divided and directed into the pipes 5, 6 and 6' at a predetermined ratio. The fluid from the pipe 5 flows into the pressure chamber 39 and from this chamber further flows through the passage 64, the chamber 32, the passages 26 and 28, the port 17 and the line 19 and 20 into the reservoir 2. In this condition, no significant pressure is established in the chamber 32 of in the pressure chambers 39 and 39'. Thus, the brake master cylinders 9 and 9' are in the brake release position. The solenoid 59 is in a de-energized condition and the valve member 56 is in a retracted position to open the valve bore 53. Thus, the flow control valve member 48 is displaced toward the left as previously described so that the chamber 50 is opened to the return port 16. In this position, slight fluid pressure may be established in the chamber 50 and also in the reaction chamber 40 due to the flow resistence at the orifice 49 and at the connection between the chamber 50 and the passage 44. The pressure in the reaction chamber 40 serves to assist the spring 38 therein to urge the power piston 36 toward the right.

When the foot pedal 11 is depressed, the valve member 29 is displaced toward the left so that the conical surface 30 therein is moved close to the piston 24 to reduce the area of the passage 28. Thus, a fluid pressure is established in the chamber 32 due to the flow resistance at the passage 28 as well as in the pressure chambers 30 and 39'. The pressure in the pressure chambers 39 and 39' overcomes the action of the springs 38 and 38' and the slight pressure in the reaction chambers 40 and 40' causing the power pistons 36 and 36' to be displaced toward the left to actuate the master cylinders 9 and 9'. The pressure increase in the pressure chamber 39 of course causes an increase in pressure in the pipe 5. However, as is well known in the art, the pressure in the pipe 5 does not have any influence on the pressure in the pipes 6 and 6'. As the power pistons 36 and 36' are displaced toward the left, the fluid in the reaction chambers 40 and 40' are discharged through the chamber 50 and the passage 44 to the line 18.

If skidding occurs in this braking condition, wheel lock is detected by appropriate detecting means (not shown) and the logic circit 60 serves to flow electric current to the solenoid 50 in accordance with the locking condition of wheels. Then, the valve member 56 is moved toward the righ. ith the assistance of the spring 58 so as to reduce the opening of the valve bore 53 in accordance with the wheel locking condition. The pressure in the chamber 51 increases to such a level as compared with that in the chamber 50 that the flow control valve member 48 is displaced toward the right under the force of the spring 51 limiting or interrupting the communication between the chamber 50 and the passage 44. Therefore, the pressure in the chamber 50 is increased and the increased pressure is transmitted through the passage 54 to the reaction chamber 40. The power piston 36 is then subjected to the increased pressure in the reaction chamber 40 and displaced toward the right to return the brake master cylinder 9 toward the brake release position. Thus, the brake force is reduced or completely eliminated in accordance with the locking condition of the wheel and the associated wheel is unlocked.

It should particularly be noted that in the arrangement of the present invention, the brake release pressure to be introduced into the reaction chambers 40 and 40' is independent from the brake applying pressure in the pressure chambers 39 and 39', so that the pressure increase rate in the reaction chambers 40 and 40' is not reduced in response to the pressure increase therein. In the illustrated embodiment, when the brake hydraulic pressure system fails, the master cylinders 9 and 9' can be mechanically actuated. For this purpose, an operator may depress the brake pedal further after the conical surface 30 of the valve member 29 engages the piston 24. Then the piston rod 27 pushes the actuator plate 43 toward the left so that the rods 41 and 41' are caused to move toward the left due to the engagement between the flanges 42 and 42' thereon and the actuator plate 43 to actuate the brake master cylinders 9 and 9'.

Figure 2:
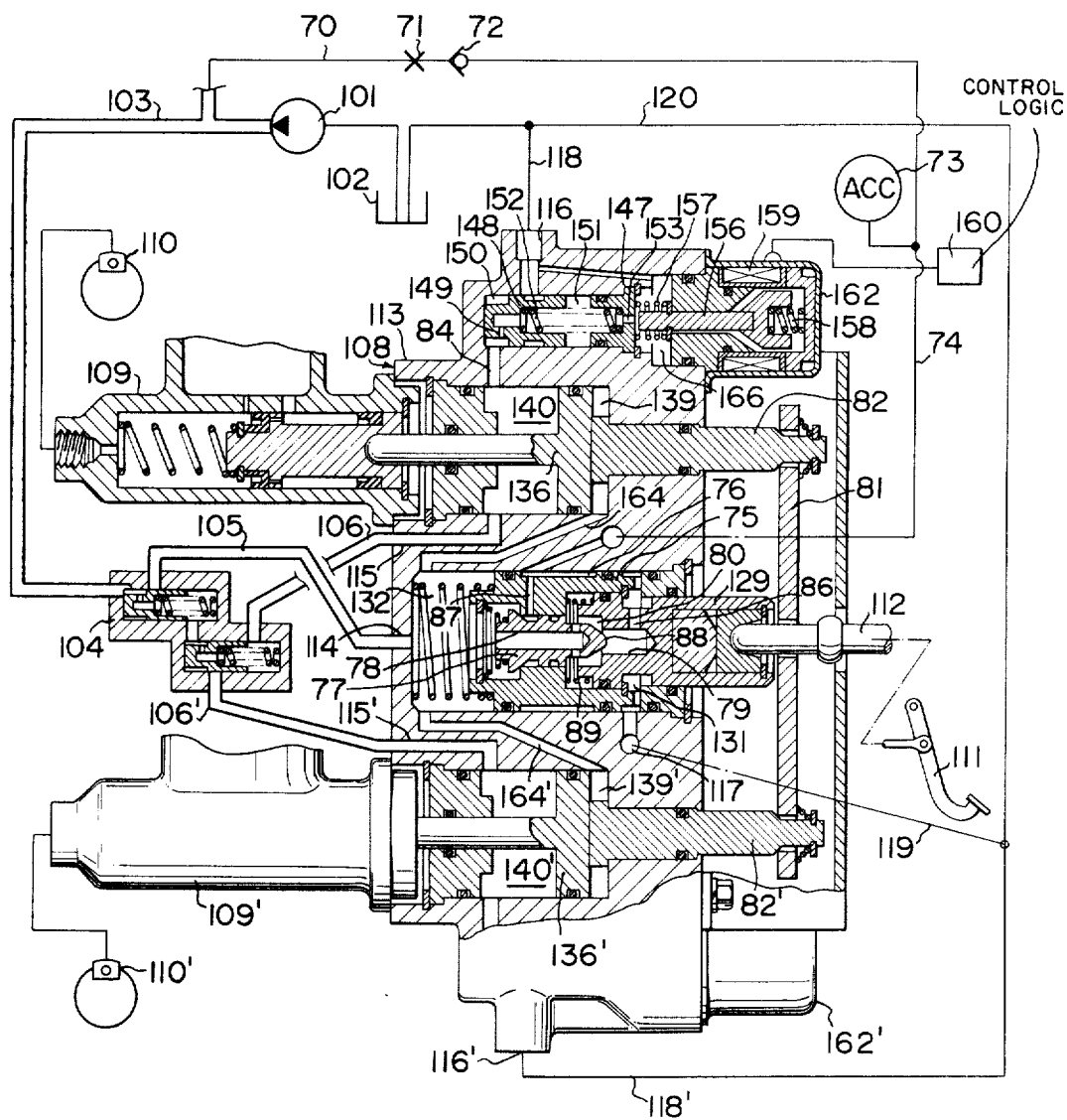
FIG. 2 is a view similar to FIG. 1 but showing another embodiment of the present invention; and, FIG. 3 is a view similar to FIGS. 1 and 2 but showing a further embodiment of the present invention.

Referring to FIG. 2, a second embodiment of the present invention is shown. In this embodiment, corresponding parts are shown by the same reference numerals as in FIG. 1 with the addition of the number 100. The brake system shown in FIG. 2 includes front and rear brakes 110 and 110' which are opratively connected respectively with brake master cylinders 109 and 109' to be actuated thereby. The brake master cylinders 109 and 109' are combined in the vehicle anti-lock brake system generally shown by numeral 108 with brake power multiplying means and anti-lock control valve means for each brake master cylinder.

The brake power multiplying means for the master cylinder 109 includes a power piston 136 which is disposed in a bore formed in a housing 113 of the vehicle anti-lock brake system and operatively connected with a piston in the master cylinder 109. A pressure chamber 139 is defined at the side of the power piston 136 opposite to the master cylinge 109, and a reaction chamber 140 is defined at the opposite side of the power piston 136. The brake power multiplying means for the master cylinder 109' is similarly constructed, so that corresponding parts are shown by the same reference numerals with the addition of a prime.

In the housing 113, there is also slidably disposed a piston 75 which defines in the housing 113 aa pair of chambers 131 and 132 at the opposite sides thereof. A manually operated control valve member 129 extends into the chamber 131 and defined a space 80 between the piston 75 and the valve member 129. The valve member 129 is connected through a rod 112 with an actuating member such as a foot pedal 111 to be actuated thereby. The piston 75 has an annular groove 76 at its outer periphery and a valve member 77 is provided in the piston 75 for controlling communication between the annular groove 76 and the chamber 132 through a radial bore 87 formed in the piston 75. The valve member 77 extends through the piston 75 and has an axial passage 78 for constantly connecting the chamber 132 with the chamber 80. Further, the valve member 77 has a conically shaped surface 88 at the end extending to the chamber 80. The valve member 77 is spring biased rightwardly to normally interrupt communication between the annular groove 76 on the piston 75 and the chamber 132. The valve member 77 establishes the communication when it is displaced toward the left against the action of bias spring.

The manually operated control valve member 129 is provided with a recess 79 which opens toward the space 80 and is connected through a radial passage 86 with the chamber 131. The recess 79 co-operates with the conical surface 88 of the valve member 77 to constitute a normally open valve by assistance of a spring 89. A fluid source 101, which may be an engine driven hydraulic pump, has an output line 103 connected with a flow divider valve 104. Flow divider valve 104 divides and directs the fluid flow from the line 103 into three pipes 105, 106 and 106' at a predetermined ratio. The pipe 105 is connected with the chamber 132. The pipes 106 and 106' are connected with the reaction chambers 140 and 140', respectively, through the passages 115 and 115'. The fluid flow supplied to this chamber 132 from the pipe 105 is directed through the valve 77 into the space 80, and therefrom through the valve constituted by the conical surface of the valve member 77 and the recess 79 in the control valve member 129 into the chamber 131. The fluid in the chamber 131 is allowed to flow through the radial passages 86 in the piston 75, a port 117, and a pipe 119 to a return line 120 which is connected with a reservoir 102. The chamber 132 is connected through passages 164 and 164' with the pressure chambers 139 and 139', respectively.

The output line 103 of the pressurized fluid source 101 has a branch line 70 which includes an orifice 71, a check valve 72 and an accumulator 73 and is connected through a line 74 with the annular groove 76 in the piston 75. The brake force multiplying means include axially movable rods 82 and 82' extending outwardly from the pressure chambers 139 and 139', respectively, and a lever or actuator plate 81 engages at the opposite ends thereof with the outer ends of the rods 82 and 82'. The rod 112 which is actuated by the foot pedal 111 passes through the actuator plate 81. When the foot pedal 111 is depressed beyond a predetermined amount, the movement of the rod 112 is transmitted through the actuator plate 81 to the rods 82 so as to move the latters leftwardly.

The anti-lock control valve means for the master cylinder 109 includes a flow control valve member 148 having an orifice 149 formed therein. The valve member 148 is axially slidably disposed in the housing 113 and defines a pair of chambers 150 and 151 at the opposite sides thereof with the orifice connecting the chambers with each other. A valve seat member 147 having an axial valve bore 153 is secured in the housing 113 at the end of the chamber 151 and a spring 152 is disposed between the valve seat member 147 and the valve member 148 to urge the latter leftwardly. The chamber 150 is connected through a passage 84 with the reaction chamber 140. The housing 113 is provided with a return port 116 which is connected through a line 118 to the return line 120 and which is brought into communication with the chamber 150 when the valve member 148 is displaced toward the right.

A solenoid assembly 162 is provided for co-operation with the valve seat member 147. The solenoid assembly 162 includes an axially movable valve member 156 having one end co-operating with the valve bore 153 in the valve seat member 147 and a spring 158 biased toward the left to close the bore 153. A solenoid coil 159 is provided for moving, when energized, the valve member 156 toward the left by overcoming a bias-force of a spring 157 disposed in a chamber 166 defined by the valve seat member 147 and the solenoid assembly 162. As in the previous embodiment, a logic circuit 160 is provided for controlling electric current to the solenoid 159 in accordance with the locking condition of wheel.

The anti-lock control valve means for the master cylinder 109' is similarly constructed to that for the master cylinder 109 so that corresponding parts are designated by the same reference numerals with the addition of prime.

In operation, pressurized fluid is continuously supplied from the source 101 through the output line 103 to the flow divider valve 104 and then directed to the pipes 105, 106 and 106' at a predetermined flow ratio. Simultaneously, pressurized fluid is also supplied through the line 70, the orifice 71 and the check valve 72 into the line 74 so that pressure is stored in the accumulator 73. The fluid in the pipe 105 is introduced into the chamber 132. The pressure then flows through the passage 78, the space 80, the chamber 131 the port 117, into return line 120, and finally to the reservoir 102. Thus, fluid pressure is not established in the chamber 132 or in the pressure chambers 139 and 139' under a normal condition.

The fluid in the pipe 106 is introduced into the reaction chamber 140 and then through the passage 84 into the chamber 150. Since the solenoid 159 is normally de-energized, the valve member 156 is retracted toward the right by the spring 157 to open the valve bore 153 so that the pressure in the chamber 151 is relieved through the bore 153, the chamber 166, the port 116 and the line 118 into the return line 120. Since a pressure difference prevails across the valve member 148 between the chambers 150 and 151, the valve member 148 is displaced toward the right to open the chamber 150 to the port 116. Therefore, the pressure in the chamber 150 is decreased with only a slight pressure being maintained therein. This pressure is also maintained in the reaction chamber 140 and serves to urge the power piston 136 toward brake release direction.

When the brake pedal 111 is depressed, the brake control valve member 129 is moved toward the left by the rod 112 so as to reduce the clearance between the valve member 77 and the recess 79. Pressure flow is thereby limited from the space 80 to the chamber 131. Thus, a pressure is established in the space 80 and also in the chamber 132. The pressure in the space 80 applies a reaction force to the valve member 129 which is sensed by an operator as a brake apply force. The pressure in the chamber 132 is transmitted through the passages 164 and 164' to the pressure chambers 139 and 139' to displace the power pistons 136 and 136' toward the left to actuate the master cylinders 109 and 109'.

When a wheel lock is sensed during a braking condition, the logic circuit 160 allows the energizing current to flow to the solenoid 159 in accordance with the locking condition. This allows the valve member 156 to be displaced toward the left to decrease the opening of the valve bore 153. Thus, the pressure in the chamber 151 is correspondingly increased and the flow control valve member 148 is correspondingly shifted toward the left. The pressures in the chamber 150 and in the reaction chamber 140 are also corresondingly increased, thereby moving the power piston toward the right and reducing or releasing the braking effort on the associated wheel.

When the fluid source 101 fails, pressure is not supplied to the chamber 132. In this condition, when the brake pedal 111 is depressed further after the valve member 129 contacts with the valve member 77, the valve member 77 is shifted toward the left to open the annular groove 76 on the piston 75 to the chamber 132. Thus, the pressure in the accumulator 73 is introduced through the chamber 132 into the pressure chambers 139 and 139'. After the pressure in the accumulator 73 is exhausted, brake force can further be mechanically applied by pushing the rods 82 and 82' leftwardly to actuate the brake master cylinders 109 and 109' through the power pistons 136 and 136'. In the illustrated embodiment, the power pistons 136 and 136' have no return springs associated therewith, so that the mechanical actuation if facilitated.

Figure 3:
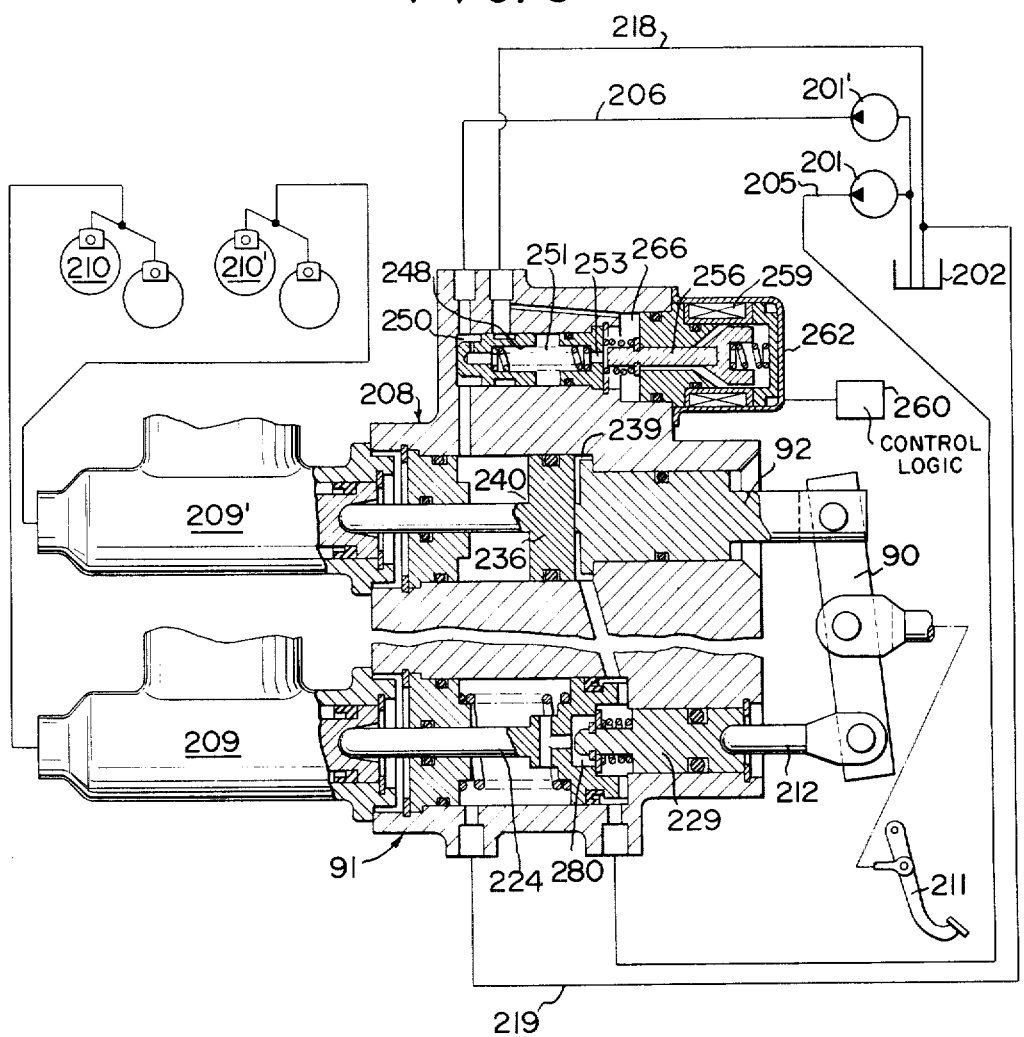

Referring to a further embodiment of the present invention shown in FIG. 3, the brake system is substantially identical to those shown in FIGS. 1 and 2 so that corresponding parts are shown by the same reference numerals as in FIG. 1 with the addition of the number 200. This embodiment is different from that shown in FIG. 1 in that two separate fluid pumps 201 and 201' are used in lieu of the fluid pump 1 and the flow divider valve 4 in FIG. 1. The first fluid pump 201 draws hydraulic fluid from a reservoir 202 and supplies it continuously through a pipe 205 in the vehicle anti-lock brake system, generally shown by the reference numeral 208, to a chamber 280 formed between a manually operated brake control valve member 229 and a power piston 224 in the brake power multiplying means 91 for the brake master cylinder 209. The pressure in the chamber 280 is transmitted into a chamber 239 defined between a piston 92 and a power piston 236 in the brake power multiplying means for the brake master cylinder 209'.

The second fluid pump 201' supplies fluid under pressure through a pipe 206 to a chamber 250 of antilock control valve means. The fluid is then supplied into the reaction chamber 240.

In operation, as the brake pedal 211 is manually depressed, the movement of the pedal is transmitted through a link 90 to the piston 92 and the mechanically operated valve member 229. The movement of the valve member 229 toward the piston 224 reduces the opening in the piston 224 to limit fluid flow from the chamber 280 to the reservoir 202 through a pipe 219. Thus, a pressure is established in the chamber 280 which is in turn transmitted to the pressure chamber 239. Thus, the piston 224 and the power piston 236 are moved toward the left to actuate the associated master cylinders 209 and 209'. The pressure in the chamber 239 applies a reaction force to the piston 92, which is sensed by the operator as a brake reaction force. During a failure of the fluid pumps 201, the master cylinders 209 and 209' can be mechanically actuated by depressing the valve member 229 and the piston 92 through the link 90 until the pistons 224 and 236 are mechanically shifted toward the left.

In a braking operation, when the rear wheel associated with the rear wheel brakes 210' are locked, the logic circuit 260 allows the electric current to flow to the solenoid 259 in the solenoid assembly 262 in accordance with the locking condition of the wheels. This decreases the opening of the axial bore 253 in the valve seat member by the movable valve member 256. Thus, the flow passage from the chamber 251 to the chamber 266 is limited and a pressure is established in the chamber 251. Therefore, the valve member 248 is shifted toward the left to interrupt the communication between the chamber 250 and the fluid return line 218, with the result that a pressure is established in the chamber 250 and the reaction chamber 240 in accordance with the locking condition of the wheels. In this manner, the power piston 236 is returned toward the right to reduce or release the braking effort.

From the above descriptions, it will be apparent that, according to the features of the present invention, the brake release pressure introduced into the reaction chamber under a wheel lock condition is independent from the brake applying pressure prevailing in the pressure chamber. Therefore, it is possible to increase the brake release pressure in the reaction chamber even above the brake applying pressure in the pressure chamber so as to obtain a quick and positive response to the wheel locking. Further, is is also possible to control the brake release pressure in the reaction chamber in accordance with the locking condition of the associated wheel. It should also be noted that in the present invention it is further possible to maintain a slight pressure in the reaction chamber under the brake release condition for urging the associated power piston toward brake release direction. This is advantageous in that the return spring for the power piston can be of a weak one or, as in the embodiments shown in FIGS. 2 and 3, may be completely omitted. In an arrangement where return springs for power pistons are omitted, it is possible to save spaces which may otherwise be required for accommodating such springs. Further, such an arrangement can be free from any troubles caused by failure of the return springs. Mechanical actuation during the failure of hydraulic system can also be further facilitated.

The invention has thus been shown and described with reference to preferred embodiments. However, it should be noted that the invention is in no way limited to the details of the illustrated structures and changes and modifications may be made without departing from the scope of the appended claims.

I claim:

1. A vehicle brake system comprising:
  a. master cylinder means for actuating at least one wheel brake;
  b. means for multiplying the braking power applied to said master cylinder means including a power piston connected to said master cylinder means with a pressure chamber defined at one side of said power piston and a reaction chamber defined at the other side of said power piston;
  c. means for introducing pressure into said pressure chamber to move said power piston in a brake-applying direction, said introducing means including a first fluid circuit;
  d. means for controlling the introduction of pressure into said pressure chamber, said means including (i) a pressure flow return line, (ii) a piston having a first chamber defined at one side of the piston and connected to said pressure chamber and said first circuit, and a second chamber defined at the other side of the piston and connected to said pressure fluid return line, (iii) a passage formed in said piston connecting said first and second chambers with each other, and (iv) a manually-operated valve member for controlling the flow of fluid through the passage of said piston to thereby regulate the pressure in said first chamber;
  e. means for introducing pressure into said reaction chamber to effect a release of said brake when wheel lock is detected, said means including a second fluid circuit independent of said first circuit;
  f. means for controlling the pressure introduced into said reaction chamber including (i) a pressure fluid return line, (ii) a fluid flow control valve defining a chamber connecting the second fluid circuit to said pressure fluid return line and to said reaction chamber, and (iii) means for controlling the position of said fluid flow control valve so as to control the flow from said chamber to said return line;
  g. electrical means for actuating said control valve position controlling means in response to the locking condition of the wheel brake; and
  h. a fluid flow divider valve having an input from a pressurized fluid source and at least two outputs connected respectively with said first and second fluid circuits.

2. The vehicle brake system in accordance with claim 1 wherein said power piston has a rod operatively connected to said master cylinder means, and said system further includes an actuator plate coupled to said rod to manually actuate said master cylinder means.

3. A vehicle brake system comprising:
  a. master cylinder means for actuating at least one wheel brake;
  b. means for multiplying the braking power applied to said master cylinder means including a power piston connected to said master cylinder means with a pressure chamber defined at one side of said power piston and a reaction chamber defined at the other side of said power piston;

c. means for introducing pressure into said pressure chamber to move said power piston in a brake-applying direction, said introducing means including a first fluid circuit;

d. means for controlling the pressure introduced into the pressure chamber, said means including a manually operated valve member for controlling fluid pressure in said pressure chamber;

e. means for introducing pressure into said reaction chamber to effect a release of said brake when wheel lock is detected, said means having a second fluid circuit independent of said first circuit and a pressure fluid return line;

f. valve means for controlling the pressure introduced into said reaction chamber and adapted to control fluid flow from said reaction chamber to said pressure fluid return line so as to provide a slightly higher pressure in said reaction chamber than in said pressure chamber during a brake release position;

g. electrical means for controlling said valve control means in response to the locking condition of the wheel brake; and h. a fluid flow divider valve having an input connected with a pressureized fluid source and having at least two outputs connected respectively with said first and second fould circuits.

4. The vehicle brake system in accordance with claim 3 further including a third fluid circuit having pressure accumulating means; said means for controlling the introduction of pressure into said pressure chamber comprising a piston having a groove formed at its outer peripheral surface and in communication with said third fluid circuit, and a passage formed in said piston and connected to said groove whereby said manually operated valve member connects said piston passage in communication with said pressure chamber during failure to pressure from said pressurized fluid source thereby to apply pressure accumulating means.

5. The vehicle brake system in accordance with claim 3 wherein said power piston has a push rod, and said system further includes an actuator plate coupled to said push rod and responsive to movement of said manually operated valve member to manually actuate said power piston in brake-appling direction.

6. A vehicle brake system comprising;
a. master cylinder means for actuating at least one wheel brake;
b. means for multiplying the braking power applied to the master cylinder means including pressure responsive means for actuating the master cylinder means, a pressure chamber defined at one side of the pressure responsive means and a reaction chamber defined at the other side;
c. means including a first fluid circuit for introducing pressure into the pressure chamber to actuate the pressure responsive means in a brake-applying direction;
d. means for controlling the introduction of pressure into the pressure chamber; and
e. anti-lock means for releasing the wheel brake under a predetermined condition including:
 i. means including a second fluid circuit independent of said first circuit for increasing pressure into said reaction chamber when wheel lock is detected,
 ii. means disposed within said second fluid circuit for controlling the application of fluid pressure to said reaction chamber including a pressure fluid return line, first and second passage means for connecting said second fluid circuit in communication with said pressure fluid return line, a first valve adapted to close and first passage means, and a second valve actuated by said first valve to close said second passage means,
 iii. electrical means for operating said first valve in accordance with the locking condition of the wheel brake.

7. Vehicle brake system in accordance with claim 6 in which said pressure responsive means comprises power piston means for actuating the master cylinder means.

8. Vehicle brake system in accordance with claim 6 which further includes housing means in which said pressure responsive means, said means for controlling the pressure introduced into the pressure chamber and said fluid pressure control means of the anti-lock means are provided.

9. The vehicle brake system in accordance with claim 6 wherein said first passage means includes an orifice formed in said second valve, a first chamber defined between said first and second valves and in communication with said orifice, and a passage in communication with said first chamber and said pressure fluid return line, and said second passage means includes a second chamber defined at one end of said second valve and adapted to be disconnected from said pressure fluid return line by said second valve when said first valve is actuated.

10. The vehicle brake system in accordance with claim 9 sherein said second valve is a spool valve; said fluid pressure control means further includes a spring disposed between said first valve and said spool valve for urging said valves apart; and the disconnecting of said second chamber from the pressure fluid return line being responsive to the level of fluid pressure in the first chamber defined between and valves.

11. The vehicle brake system in accordance with claim 10 further including a fluid flow divider valve having an input from a pressurized fluid source and at least two inputs connected respectively with said first and second fluid circuits; said pressure responsive means comprising a power piston for actuating the master cylinder means; and said means for controlling pressure introduced into said pressure chamber comprising a piston having a first chamber defined at one side and in communication with said pressure chamber and said first fluid circuit, and a second chamber defined at the other side and connected to said pressure fluid return line, said chambers being connected with each other by a passage formed in said piston, and a manually operated valve member for controlling the flow of fluid through said passage of the piston thereby to regulate the pressure in said first chamber.

12. The vehicle brake system in accordance with claim 11 wherein said power piston has a rod operatively connected to said master cylinder means, and said system further includes an actuator plate coupled to said rod and responsive to movement of said manually operated valve member to manually actuate said master cylinder means.

13. The vehicle brake system in accordance with claim 6 further including a fluid flow divider means having an input from a pressurized fluid source and at least two outputs connected respectively with said first and second fluid circuits; said means for controlling pressure introduced into said pressure chamber including an manually operated valve member for controlling fluid pressure in said pressure chamber, and said fluid pressure controlling means for said reaction chamber being adapted for controlling fluid flow from said reaction chamber to said pressure fluid return line so as to provide a slightly higher pressure in said reaction chamber that in said pressure chamber during a brake release position.

14. The vehicle brake system in accordance with claim 13 further including a third fluid circuit having pressure accumulating means; said means for controlling the introduction of pressure into said pressure chamber comprising a piston having a groove formed at its outer peripheral surface and in communication with said third fluid circuit, and a passage formed in said piston and connected to said groove whereby said manually operated valve member connects said piston passage in communication with said pressure chamber during failure of pressure in said first circuit thereby to apply pressure from said pressure accumulating means.

15. The vehicle brake system in accordance with claim 13 wherein said pressure responsive means comprises a power piston having a push rod connected thereto, and said system further includes an actuator plate coupled to said push rod and responsive to movement of said manually operated valve member to manually actuate said power piston in brake-applying direction.

* * * * *

UNITED STATES PATENT AND TRADEMARK OFFICE
CERTIFICATE OF CORRECTION

PATENT NO. : 3,927,915
DATED : December 23, 1975
INVENTOR(S) : Yoshiharu Adachi

It is certified that error appears in the above-identified patent and that said Letters Patent are hereby corrected as shown below:

IN THE CLAIMS:

Claim 1, column 10, line 28, insert --fluid-- after "first".

Claim 3, column 11, line 27, delete "fould" and insert --fluid--.

Claim 4, column 11, line 38, delete "to" and insert --of--;

line 39, after "pressure", insert --from said pressure--.

Claim 6, column 12, line 5, delete "and" and insert --said-- line 7, after "means,", insert --and--.

Claim 10, column 12, line 33, delete "sherein", and insert --wherein--;

line 39, delete "and" and insert --said--.

Claim 11, column 12, line 42, delete "input" and insert --output--.

Signed and Sealed this sixteenth Day of March 1976

[SEAL]

Attest:

RUTH C. MASON
*Attesting Officer*

C. MARSHALL DANN
*Commissioner of Patents and Trademarks*